(12) United States Patent
Markwart et al.

(10) Patent No.: US 9,906,962 B2
(45) Date of Patent: Feb. 27, 2018

(54) CONFIGURATION OF RESOURCE USAGE IN COMMUNICATION SYSTEMS

(71) Applicant: NOKIA SOLUTIONS AND NETWORKS GMBH & CO. KG, Munich (DE)

(72) Inventors: Christian Markwart, Munich (DE); Ruediger Halfmann, Otterberg (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 0 days.

(21) Appl. No.: 14/895,338

(22) PCT Filed: Jun. 11, 2013

(86) PCT No.: PCT/EP2013/061990
§ 371 (c)(1),
(2) Date: Dec. 2, 2015

(87) PCT Pub. No.: WO2014/198297
PCT Pub. Date: Dec. 18, 2014

(65) Prior Publication Data
US 2016/0127912 A1   May 5, 2016

(51) Int. Cl.
*H04W 40/00* (2009.01)
*H04W 16/14* (2009.01)
(Continued)

(52) U.S. Cl.
CPC ........... *H04W 16/14* (2013.01); *H04M 3/42* (2013.01); *H04W 4/02* (2013.01); *H04W 16/10* (2013.01); *H04W 64/00* (2013.01)

(58) Field of Classification Search
CPC .... H04M 3/42; H04M 7/1245; H04M 7/1255; H04W 16/14; H04W 16/10; H04W 4/02;
(Continued)

(56) References Cited

U.S. PATENT DOCUMENTS

| 2005/0037764 A1* | 2/2005 | Trachtman | H04W 16/00 455/450 |
| 2012/0140689 A1* | 6/2012 | Pelletier | H04W 76/048 370/311 |

(Continued)

FOREIGN PATENT DOCUMENTS

WO    2012/150534 A1    11/2012

OTHER PUBLICATIONS

International Search Report and Written Opinion for International Application No. PCT/EP2013/061990, dated May 9, 2014, 13 pages.
(Continued)

*Primary Examiner* — Fred Casca
(74) *Attorney, Agent, or Firm* — Brake Hughes Bellermann LLP

(57) ABSTRACT

Apparatus and method for communication are provided. The solution may include serving one or more cells of a radio access system, the geographical area of the radio access system comprising one or more reservation zones, where the use of the resources of the zones may be activated or deactivated by a network element of the system; storing for each served cell category classification information of each served cell, the category classification describing how the cell interferes with each of the one or more authorized/licenced shared access reservation zones; storing one or more predetermined actions for each category classification and reservation zone; receiving a command from a network element related to the activation or deactivation of one or more authorized/licenced shared access reservation zones and executing one or more predetermined actions on the basis of the command.

19 Claims, 5 Drawing Sheets

(51) Int. Cl.
*H04W 4/02* (2018.01)
*H04M 3/42* (2006.01)
*H04W 16/10* (2009.01)
*H04W 64/00* (2009.01)

(58) Field of Classification Search
CPC ..... H04W 64/00; H04W 24/10; H04W 16/02; H04W 72/0493
USPC .................. 455/447, 450, 454, 456.2, 456.3; 370/329, 356, 352
See application file for complete search history.

(56) References Cited

U.S. PATENT DOCUMENTS

2013/0279435 A1* 10/2013 Dinan ............... H04W 56/0005 370/329
2013/0316710 A1* 11/2013 Maaref ................ H04W 16/10 455/436

OTHER PUBLICATIONS

FM(12)084 Annex 47; Report on ASA concept; European Telecommunications Standards Institute (ETSI), XP014098095; May 2012, pp. 1-11.
ETSI TR 102 907 v0.1.7 (Sep. 2011); Reconfigurable Radio Systems (RRS); Use Cases for Operation in White Space Frequency Bands.

* cited by examiner

CONFIGURATION OF RESOURCE USAGE IN COMMUNICATION SYSTEMS

This application is a national stage entry of PCT Application No. PCT/EP2013/061990, filed Jun. 11, 2013, entitled "CONFIGURATION OF RESOURCE USAGE IN COMMUNICATION SYSTEMS" which is hereby incorporated by reference in its entirety.

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In the long term evolution advanced (LTE-Advanced) communication system, which is currently being developed, the concept of authorized shared access (ASA) or licensed shared access (LSA) has been under consideration. ASA/LSA spectrum is typically owned by an Incumbent (primary user) who allows other licensed operators (secondary user) to use this spectrum for their purpose. Thus, ASA/LSA allows support of different operators by using separated ASA/LSA resources. Each ASA/LSA resource is defined by a spectrum part and a corresponding time interval and location where this spectrum part is used.

Traditionally in mobile networks, spectrum utilization and allocation is performed via static configurations based on network planning data of a Mobile Network Operator (MNO). With the introduction of ASA/LSA it is no longer possible to stay with these static configurations because ASA/LSA spectrum may be needed to be evacuated from according to predefined terms and conditions if requested by the incumbent (primary user).

SUMMARY

According to an aspect of the present invention, there is provided an apparatus as in claim 1.

According to an aspect of the present invention, there is provided an apparatus as in claim 7.

According to an aspect of the present invention, there is provided a method as in claim 10.

According to an aspect of the present invention, there is provided a method as in claim 16.

Some embodiments of the invention are defined in the dependent claims.

LIST OF DRAWINGS

Embodiments of the present invention are described below, by way of example only, with reference to the accompanying drawings, in which FIGS. 1A and 1B illustrate an example of a communication environment;

DESCRIPTION OF SOME EMBODIMENTS

Figure 1A:
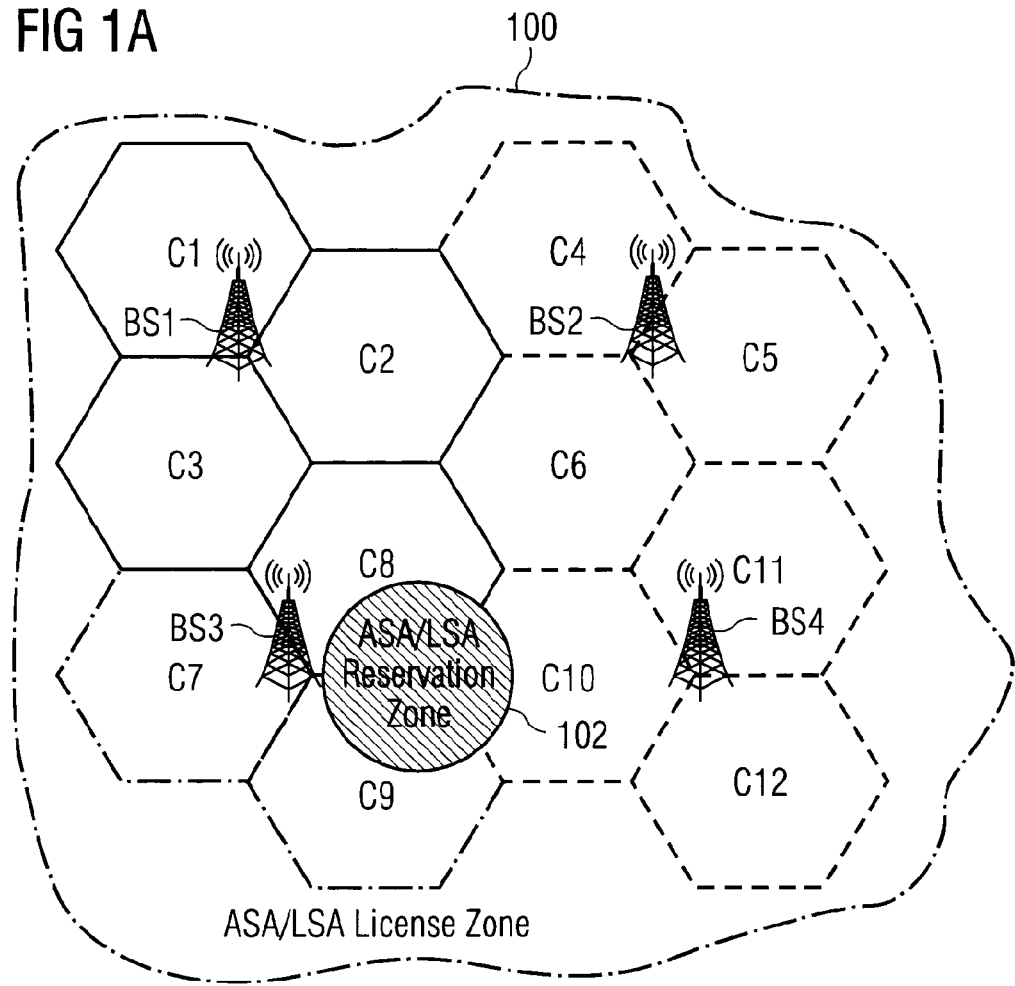

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any base station, network element, user equipment (UE), server, corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE®, known also as E-UTRA), long term evolution advanced (LTE-A®), Wireless Local Area Network (WLAN) based on IEEE 802.11standard, worldwide interoperability for microwave access (WiMAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately.

In the LTE-Advanced, the concept of authorized shared access (ASA) or licensed shared access (LSA) has been under consideration. The ASA/LSA allows new users to access already licensed spectrum with the obligation to protect the incumbent (primary) user. For example, the ASA/LSA allows international mobile telecommunications (IMT) service to access the bands that are under-utilised by existing primary uses, especially to bands that have been allocated to mobile but not made available for mobile use through current regulatory means. In general, the ASA/LSA is neither similar to exclusive licensing nor license-exempt but has few commonalities with licensing-light. According to the ASA/LSA concept, a secondary usage is possible, but the operator needs to evacuate its ASA/LSA spectrum for providing service to primary ASA/LSA users, if required.

The incumbent may reserve an ASA/LSA resource for own usage. Such reservations could be defined by static rules (such as a defined zone and/or time where the spectrum is used by the incumbent) or dynamic rules (such as evacuation of spectrum currently used by secondary Mobile Network Operator MNO on request from the incumbent for emergency situations). In both cases zones where spectrum use under ASA/LSA is not allowed are defined by geographical area, time and transmitter/receiver characteristics. Additionally the evacuation lead time (the time between initialize the request to free up the ASA/LSA spectrum zone and the finalization of the spectrum evacuation) may be defined as another input parameter to the MNO.

The MNO has to perform appropriate measures in the network, e.g. re-configurations or switch off ASA/LSA spectrum of specific Base Stations without violating the evacuation lead time when spectrum resource reservation actions are requested by incumbent. Typically such measures are easy to realise because the MNO is aware of the location and behaviour of each base station and the ASA/LSA reservation zones are known. This information may be used in a planning process to get the information needed to perform reservation actions.

FIG. 1A illustrates an example of such a scenario with four 3-sector Base Stations BS1, BS2, BS3 and BS4 covering a defined ASA/LSA license zone 100. Each sector defines an independent cell C1, C2 . . . C12. Inside the ASA/LSA license zone, the incumbent has defined a reservation zone 102 which needs to be evacuated on request.

Figure 1B:
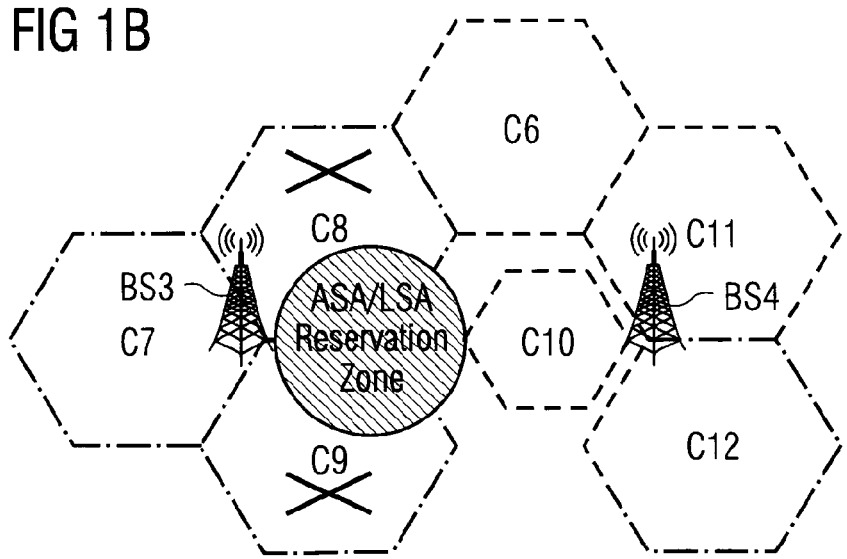

The MNO uses the aforementioned information to determine the affected cells C8, C9 and C10 and derives the measures for evacuation. The measures may be to switch off ASA/LSA spectrum for C8 and C9 and reconfigure C10 to reduce cell size, for example. The measures for evacuation are illustrated in FIG. 1B.

Evacuation of ASA/LSA spectrum is often not time critical, but most use cases, especially spectrum used for public safety and defence, have the hard requirement to provide a reliable assignment and evacuation of ASA/LSA spectrum. There must be a control solution that allows assigning or evacuating ASA/LSA spectrum in a simple and reliable way. In the example of FIGS. 1A and 1B, there is a need to provide for all cells C1-C12 the right assignment and evacuation procedures for ASA/LSA spectrum. Without such a solution ASA/LSA spectrum could not be used by Mobile Operators in an effective way.

Figure 2:
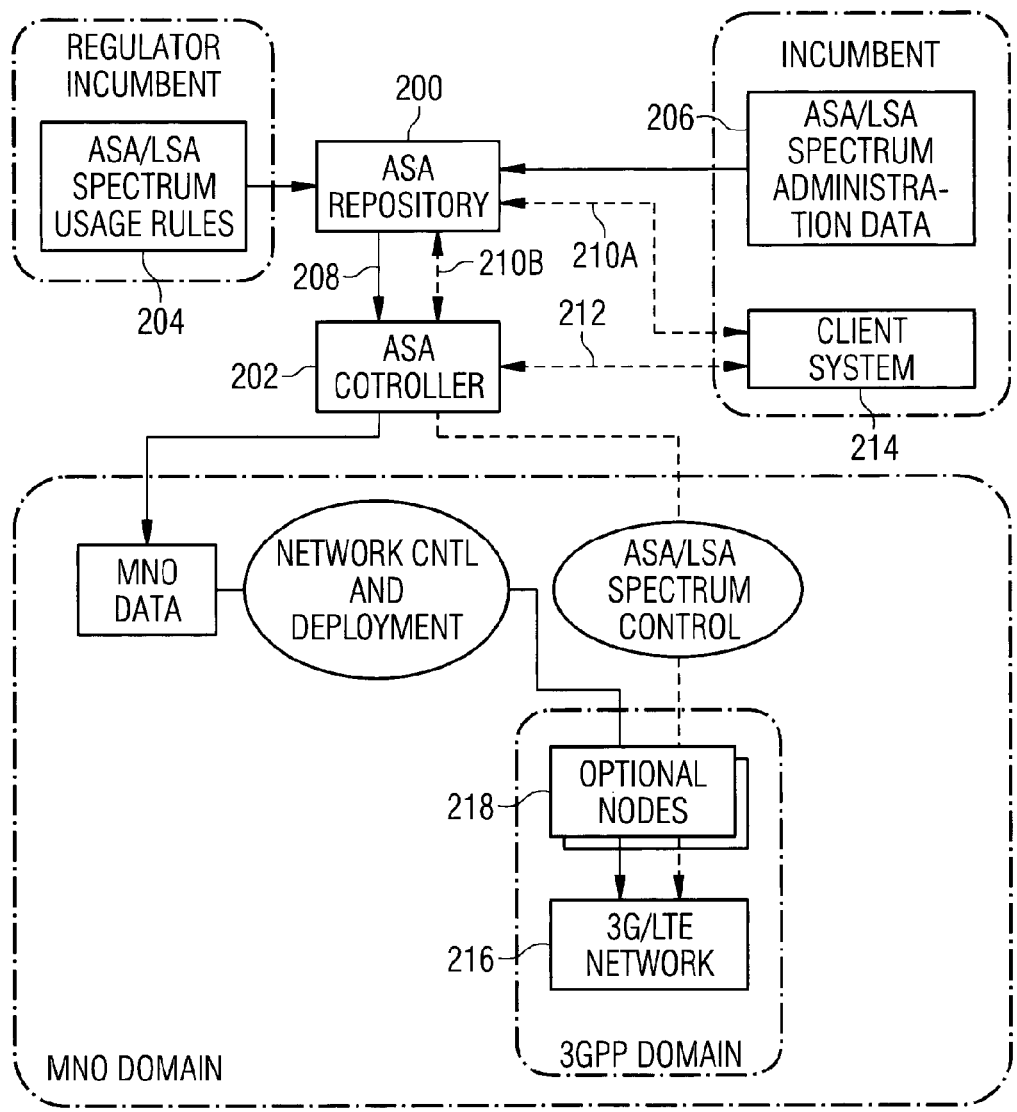
FIG. 2 illustrates a simplified example view of a communication environment

FIG. 2 illustrates a simplified example view of a communication environment where ASA/LSA is utilised only showing some elements and functional entities, all being logical units whose implementation may differ from what is shown. The connections shown in FIG. 2 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on 3G/LTE network elements is shown. However, the embodiments described in these examples are not limited to the 3G/LTE or LTE-A radio systems but can also be implemented in other radio systems.

In this example, the ASA/LSA framework introduces two functional entities to a mobile network, the ASA/LSA repository ALR 200 and the ASA/LSA controller ALC 202. The proposed entities take care of configuring, deploying and administering of ASA/LSA in the mobile network.

In an embodiment, the ASA/LSA repository ALR 200 receives ASA/LSA related information from regulator and incumbent, the information comprising ASA/LSA spectrum usage rules 204. The ASA/LSA repository ALR 200 may also receive ASA/LSA spectrum administration data 206 from Incumbent.

The ASA/LSA repository ALR 200 transmits the 208 information to the ASA/LSA controller ALC 202. The ALC 202 may also request information from the ALR 200.

The ASA/LSA controller ALC 202 uses the information from the ALR 200 to provide it to the mobile operator network. The ASA/LSA controller 202 may be an independent network element or it may be a network function that extends already defined network systems. In an embodiment, the information that is delivered by the ASA/LSA repository 200 may be split at least in two major tasks: 1) Network Configuration and Deployment and 2) ASA/LSA Spectrum Control.

In Network Configuration and Deployment, the input from the ALR 202 and current network data of the mobile operator may be used to start a network planning process for the ASA/LSA spectrum. In an embodiment, the output data of the network planning process are configuration parameters for each base station using the ASA/LSA spectrum, which are deployed to the respective base station. There is no need for a near real time process but it is necessary to support multivendor base stations due to typical mobile operator networks.

In ASA/LSA Spectrum Control, the ASA/LSA spectrum is a shared resource owned by an incumbent. Whenever the incumbent requests to stop the use of parts or complete ASA/LSA spectrum (evacuation) or offers the use of parts or complete ASA/LSA spectrum (assignment) it is necessary to initiate the evacuation or assignment of the ASA/LSA spectrum in the mobile network. Details about ASA/LSA Reservation Zones, evacuation time, evacuation procedures, etc. are typically defined in the contract between the incumbent and the mobile operator and are stored in the ALR 200 (ASA/LSA spectrum usage rules).

In a dynamic ASA/LSA spectrum allocation and de-allocation process for MNOs the ALC 202 can be seen as an entry point for incumbents to offer and claim back owned ASA/LSA spectrum. In an embodiment, the ALC 202 may request or receive 210A, 210B assignment or evacuation signals/information either from the ALR 200. In an embodiment, the ALC 202 may request or receive assignment or evacuation signals/information via another interface 212 connected to a client system 214 of the incumbent. The ALC 202 is operated by a mobile network operator and has the task to mediate the requests from incumbents to control used ASA/LSA spectrum in the radio access network RAN of the operator. The control mechanism is based on a signal/information that is sent via a direct or indirect communication path to the respective Base Stations of the 3G/LTE network 216. While the direct communication path connects the ALC to the BS the indirect communication path uses further nodes from Core Network CN or Operation and Maintenance Network OMN 218 (e.g. Mobile Management Entity MME or Element Manager EM) to transport the ASA/LSA spectrum control information.

In an embodiment, a prioritisation based method for dynamic assignment or evacuation of ASA/LSA spectrum in a mobile network is provided via a generic command or signal/information, sent by a network node that is connected via a communication path to a radio access network of the mobile network. The generic command or signal/information may be sent directly or via further network nodes, using further communication paths to the base stations that uses the ASA/LSA spectrum in the radio access network. The further network nodes may forward the generic command or signal/information with or without an adaptation or mediation of the original generic signal/information.

In an embodiment, the base stations of the radio access network are configured to store one or more pre-defined resource control procedures or configurations related to ASA/LSA spectrum usage.

In an embodiment, the signal/information received by the base stations triggers one or a set of pre-defined resource control procedures or configurations at the base stations which use the ASA/LSA spectrum in the radio access network. The resource control procedures and configurations are pre-configured at each base station using the ASA/LSA spectrum according to its interference level with one or several defined ASA/LSA Reservation Zones.

As the example of FIG. 1B illustrates, it is possible to distinguish between three different types of category classification information or cell types when ASA/LSA is dynamically used:

Type1: The cell doesn't interfere with a defined ASA/LSA reservation zone (cells C6, C7, C11 and C12)

Type2: The cell interferes slightly with a defined ASA/LSA reservation zone (cell C10)

Type3: The cell interferes severely with a defined ASA/LSA reservation zone (cells C8 and C9)

The three ASA/LSA Cell Types illustrated above may naturally be expanded to a higher number of category classification information or cell types to introduce further action types and priorities. This allows covering more complex scenarios.

These cell types define the interference level of each cell with one or several defined ASA/LSA Reservation Zones For each cell type specific actions may be derived from the network planning process, which are performed by the Base Station when an ASA/LSA spectrum update with assignment and evacuation signal/information is received. The defined actions may be a procedure or a set of procedures that are initiated and processed locally for each ASA/LSA cell at the base stations. A procedure may consist of a single or a set of commands to switch on/off or reconfigure ASA/LSA cells. The reconfiguration commands may be either direct commands to change or modify and activate parameters of the ASA/LSA cell or commands to load and activate an alternative ASA/LSA cell configuration that is used to avoid the violation of the allowed interference thresholds for the ASA/LSA reservation zone or a combination of both.

In an embodiment, the described method allows flexible management of ASA/LSA spectrum in the mobile network by using a single signal/information (ASA/LSA spectrum update). The single signal is used to initiate different actions at the base stations of a mobile network. In more detail the proposed ASA/LSA spectrum assignment or evacuation mechanism in a mobile network with a single signal/information is performed as follows:

In a first step, based on performance measurements (Key Performance Indicators KPIs), mobile network planning data (location and configuration details for each cell in a mobile operator network) and ASA/LSA reservation zone definitions (geographical area, time and transmitter/receiver characteristics), each ASA/LSA cell may be classified with the a cell type for all ASA/LSA reservation zones. The type parameter for each combination of ASA/LSA cell and defined ASA/LSA reservation zone is used to address the predefined action(s) for each ASA/LSA cell.

Figure 3:
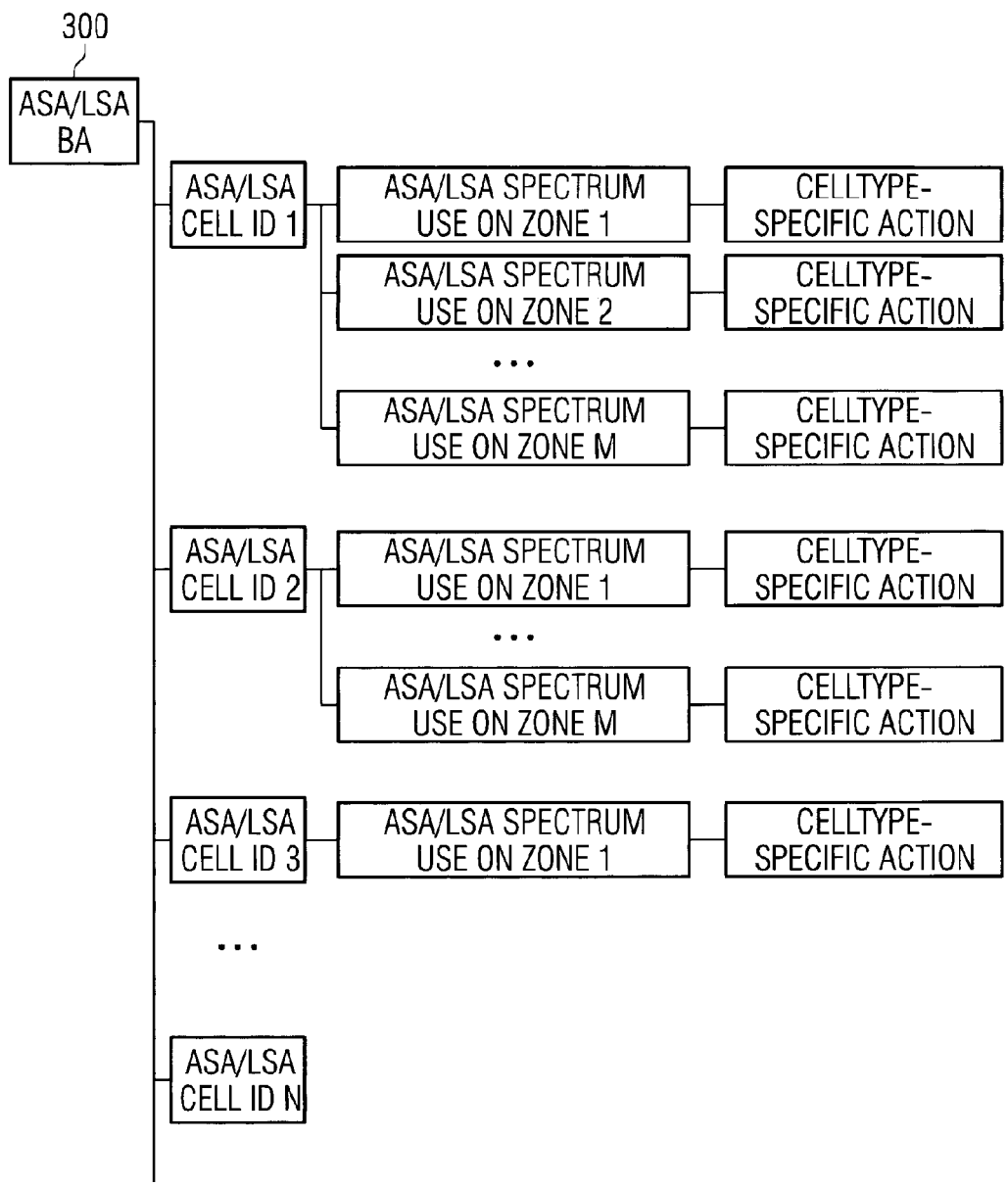
FIG. 3 illustrates an example of category classification of cells.

FIG. 3 illustrates an example of the classification. The figure illustrates an example of data which describes the classification of N cells maintained by a base station 300. In this example, there are M ASA/LSA reservation zones in the area served by the base station. For each cell of the base station, data comprises the relation of the cell to each the ASA/LSA reservation zone. In addition, the data comprises a cell type specific action for the ASA/LSA reservation zone. The cell type specific action may be setting the use of ASA/LSA spectrum to off or on, reconfiguration of the cell, or no action, for example.

Carrier Aggregation in LTE-Advanced networks is supported by the proposed solution as well, because each component carrier forms a serving cell that corresponds to an ASA/LSA cell in FIG. 3.

A base station may be configured to store a data structure of FIG. 3. In a second step, for each ASA/LSA cell of Type1, 2, and 3 a base set of configuration parameters for the ASA/LSA cell is provided by the Network planning process. The Network planning process consists of several steps typically performed by a commercial network planning software that runs on one or several servers (a data base server, performance data evaluation server, for example). Based on mobile network data like base station locations, propagation maps for spectrum, performance measurement data (KPIs), and configuration details of a mobile operator Radio Access Network RAN and ASA/LSA license definitions like geographical ASA/LSA license area, ASA/LSA spectrum, usage, lead times, and ASA/LSA reservation zones with respective transmitter/receiver characteristics, the network planning software may identify all base stations and determine their respective cells which use ASA/LSA spectrum and provide appropriate configuration parameters for these ASA/LSA cells. Additionally it is possible to derive the cell type information based on the propagation maps for the location of the ASA/LSA cells and the ASA/LSA reservation zone definitions. The method is comparable to existing network planning methods used on country borders. The network planning process is not standardized and therefore proprietary for the MNOs.

For ASA/LSA cells of Type2, an additional alternative set of configuration parameters is provided for each ASA/LSA Reservation Zone that overlaps with the respective ASA/LSA cell (cell C10 in FIGS. 1A and 1B). All sets of configuration parameters for the ASA/LSA cells that belong to a Base Station (in FIG. 1B cell C7, C8 and C9 belongs to BS3) are deployed to this base station. The deployment is finished when all ASA/LSA cells of all base station in the mobile network are configured for using the ASA/LSA spectrum. As a result the mobile network of the MNO is prepared to use the ASA/LSA spectrum as soon as the Incumbent allows it. In an embodiment, default value settings for the ASA/LSA Reservation Zones and Cell Type may be introduced to simplify the pre-configurations of a base station If an ASA/LSA Reservation Zone doesn't overlap with the cell (Cell Type1), both need not to be configured, i.e. Reservation Zones and Cell Type1 combinations may be no longer part of the base station configuration as shown in FIG. 3. Further if only the ASA/LSA Reservation Zone is defined in the configuration the default parameter for a missing Cell Type may be either Cell Type2 or Cell Type3. The use of Cell Type3 as default is beneficial when planning to extend the Cell Types at a later stage.

In a third step, the Incumbent may offer or request the owned ASA/LSA spectrum to the MNO. The request or offer is initiated via a client system 214 directly or via the ALR 200 to the ALC 202. The offer and request signal 212, 210A, 210B includes the information ASA/LSA spectrum part, ASA/LSA Reservation Zone identification and optional time parameters.

The ALC 202 adapts the request and offer signal with the help of further information on ASA/LSA spectrum usage rules and ASA/LSA spectrum administration data from the ALR 200 and generates a generic single ASA/LSA spectrum assignment/evacuation signal/information that is forwarded directly or via further network nodes, using further communication paths to the base stations in the Radio Access Network 216 that uses the ASA/LSA spectrum.

In a fourth step, when a base station receives an ASA/LSA spectrum assignment or evacuation signal/information it checks the ASA/LSA cell type data structure (illustrated in FIG. 3) if an ASA/LSA cell of the base station overlaps with the ASA/LSA reservation zone, addressed in the assignment or evacuation signal/information. In case that an overlapping is detected, the base station determines and initiates the respective pre-defined actions for the respective ASA/LSA cell as defined in above. Table 1 gives an overview on the actions initiated for each ASA/LSA cell type.

TABLE 1

| Received update signal/information | Actions initiated and performed at BS for ASA/LSA Reservation Zones | | |
| --- | --- | --- | --- |
| | Cell Type 1 | Cell Type 2 | Cell Type 3 |
| Activate use of ASA/LSA spectrum | Base configuration of ASA/LSA spectrum is activated | Base configuration of ASA/LSA spectrum is loaded and activated | Base configuration of ASA/LSA spectrum is activated |
| Deactivate use of ASA/LSA spectrum | Signal/information is ignored; Base Configuration of ASA/LSA spectrum remains activated | Alternative configuration of ASA/LSA spectrum is loaded and activated | Base Configuration of ASA/LSA spectrum is deactivated |

In case that an ASA/LSA cell overlaps with more than one ASA/LSA Reservation Zone a following priority scheme may be used to identify the correct action:
 Actions initiated and performed at BS for Cell Type1 have priority low
 Actions initiated and performed at BS for Cell Type2 have priority medium
 Actions initiated and performed at BS for Cell Type3 have priority high Following rule set may be used to identify the actions that are initiated and performed by the Base Station for a ASA/LSA cell:
 The base station is configured to check for each ASA/LSA Cell the Cell Type for the received ASA/LSA Reservation Zones for the ASA/LSA Cell as defined in FIG. 3.

If the base station detects at least one Cell Type3 the ASA/LSA spectrum usage is switched off due to the high priority of Cell Type3.

If the base station detects only Cell Type1 for all ASA/LSA Reservation Zones the Base Configuration is used as defined in Table 1.

If the base station detects only Cell Type1 except of one Cell Type2 the defined actions for the detected Cell Type2 is performed as defined in Table 1.

If the base station detects only Cell Type1 except of at least 2 Cell Type2 the defined actions for Cell Type3 are performed as defined in Table 1.

Alternatively the MNO may define in the second step above further alternative configurations of ASA/LSA spectrum that are used to guarantee no interference with the multiple ASA/LSA Reservation Zones overlapping with the ASA/LSA Cell. With such a further alternative configuration it is possible to perform the defined actions for Cell Type2 as defined in Table 1 instead of the actions for Cell Type3. Due to the complexity of possible overlapping scenarios and limitations of the base station to handle higher numbers of configuration alternatives for the ASA/LSA spectrum may be advisable for a MNO to check if one further alternative configuration of ASA/LSA spectrum can be found to cover the combinations of Cell Type2 and to use a simple rule for combinations. The rule is then—if no Cell Type3 is detected but a combination of Cell Type2 and a further alternative configuration is defined for ASA/LSA Spectrum, perform actions for CellType2 as defined in Table 1 and use the further alternative configuration for ASA/LSA spectrum when applicable. Otherwise perform actions defined for Cell Type3.

In an embodiment, the ALC 202 may combine several spectrum ASA/LSA spectrum offers or combine several ASA/LSA spectrum requests received by the client system 214 to generate a single signal/information for the 3G/LTE Network 216. The ALC 202 may also receive a combined spectrum ASA/LSA spectrum offer or a combined ASA/LSA spectrum request by the client system 214 to mediate it to a single signal/information for the 3G/LTE Network 216.

The activation or evacuation of the complete ASA/LSA spectrum may be further optimized by defining either a ASA/LSA Reservation Zone that overlaps with all ASA/LSA cells of an operator or for the update ASA/LSA spectrum signal/information a parameter (e.g. ALL) that covers all ASA/LSA cells at ASA/LSA Cell-ID level or ASA/LSA Reservation Zone level in FIG. 3.

Figure 4:
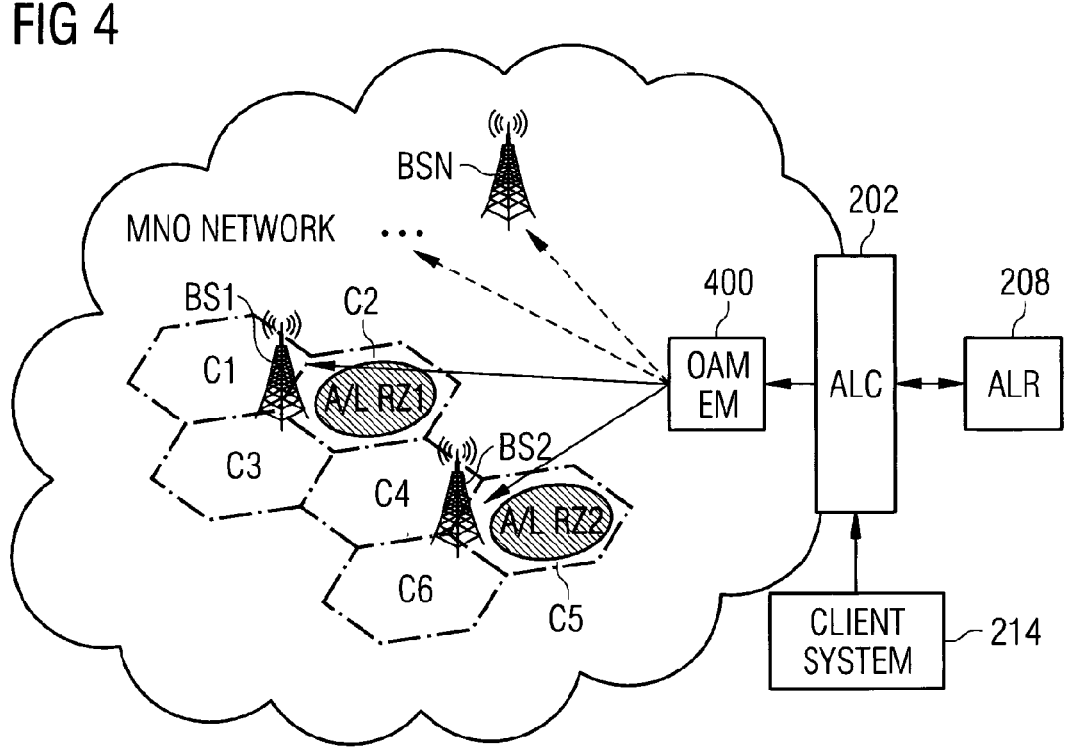
FIG. 4 illustrates an example of a radio access network.

FIG. 4 illustrates an example of a radio access network RAN of a Mobile Network Operator MNO. In this example, the RAN comprises N Base Stations BS, each with 3 sectors. Each sector defines an independent cell. In this example cells C1-C6 are configured to use ASA/LSA spectrum. Thus, base stations BS3-BSN in the MNO RAN are out of scope. There are two predefined ASA/LSA reservation zones A/L RZ1 and A/L RZ2 that are defined by the Incumbent (owner of the ASA/LSA spectrum. The Incumbent allows the MNO to use the ASA Spectrum in the MNO RAN in the area covered by the Cells C1-C6 but the Incumbent needs the owned ASA/LSA spectrum from time to time to operate a own wireless service. For this reason the Incumbent has defined two ASA/LSA Reservation Zones where the ASA/LSA spectrum use is not allowed whenever the wireless service of the Incumbent is activated. As soon as the wireless service of the Incumbent is deactivated the MNO is informed that the use of the ASA/LSA spectrum is again allowed in both or at least one ASA/LSA Reservation Zone. The Incumbent signals the ASA/LSA spectrum offer (wireless service is deactivated) and request (wireless service will be activated) for the ASA/LSA Reservation Zones A/L RZ1 and/or A/L RZ2 via a Client System 214 to the ALC 202 of the MNO.

The MNO performs a Network Planning for BS1 and BS2 and deploys the ASA/LSA Spectrum Configuration Parameters for cells C1-C3 to BS1 and for cells C4-C6 to BS2. Additionally the BS1 is configured with the information that ASA/LSA cell C2 overlaps with A/L RZ1 and BS2 is configured with the information that ASA/LSA cell C5 overlaps with A/L RZ2. Thus, according to FIG. 3 BS1 has the information for cell C2 that for A/L RZ1 the cell type is set to Type3 and BS2 has the information for cell C5 that for A/L RZ2 the cell type is set to Type3. Further information is not configured because of the default setting of not listed A/L RZ and Cell Type information.

In a second step the ALC 202 activates the ASA/LSA spectrum use for cells C1, C3, C4, and C6 according to the ASA/LSA spectrum usage rules stored in the ALR 208 and informs the ALR 208 about the usage. When the Incumbent offers the ASA/LSA spectrum for the A/L RZ1, but not for A/L RZ2 the ALC 202 determines the status of the ASA/LSA Reservation Zones and the ASA/LSA Spectrum usage rules stored at the ALR 208 and mediates the offer to a single ASA/LSA update signal/information with following content: Update ASA/LSA spectrum at BS1 and BS2 [activate ASA/LSA spectrum (A/L RZ1 )] and forwards the Update ASA/LSA spectrum signal/information via the OAM Element Manager 400 to the two BS in the RAN Network. BS1 determines the ASA/LSA cells that are overlapping with the ASA/LSA Reservation Zone A/L RZ1 and the respective Cell Type, which is for this example Type3. BS1 checks the current cell status for C2 and activates the ASA/LSA spectrum according to Table 1. BS2 determines that no ASA/LSA cells are overlapping with the ASA/LSA Reservation Zone A/L RZ1 and will ignore the Update ASA/LSA spectrum signal.

Some advantages of the proposed solution are easy integration in current networks because solution is based on standardized interfaces. In addition, single signal/information speeds up evacuation and assignment time for ASA/LSA spectrum use and single signal/information for update ASA/LSA spectrum avoids complex transaction handling and roll backs that is needed for multiple network commands.

Figure 5:
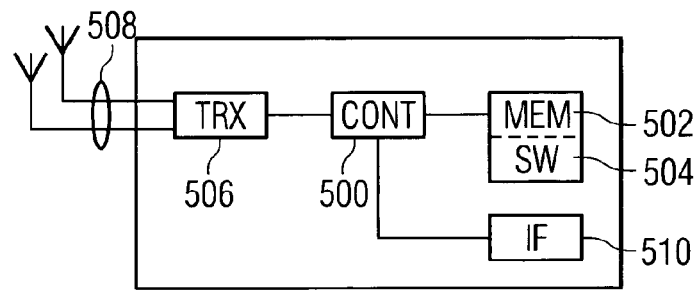
FIG. 5 illustrates an example of an apparatus applying some embodiments of the invention.

FIG. 5 illustrates an embodiment. The figure illustrates a simplified example of an apparatus in which embodiments of the invention may be applied. In some embodiments, the device may be a base station or eNodeB or a part of an eNodeB.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 500 configured to control at least part of the operation of the apparatus.

The apparatus may comprise a memory 502 for storing data. Furthermore the memory may store software 504 executable by the control circuitry 500. The memory may be integrated in the control circuitry.

The apparatus comprises a transceiver 506. The transceiver is operationally connected to the control circuitry 500. It may be connected to an antenna arrangement 508 comprising one more antenna elements or antennas.

The software 504 may comprise a computer program comprising program code means adapted to cause the control circuitry 500 of the apparatus to control the transceiver 506.

The apparatus may further comprise an interface 510 operationally connected to the control circuitry 500. The interface may connect the apparatus to other respective apparatuses such as eNodeB via X2 interface or to the core network or ALC.

The control circuitry 500 is configured to execute one or more applications. The applications may be stored in the memory 502. The applications may cause the apparatus to serve one or more cells of a radio access system, the geographical area of the radio access system comprising one or more authorized/licenced shared access reservation zones, where the use of the resources of the zones may be activated or deactivated by a network element of the system; for each served cell store category classification information of each served cell, the describing how a cell interferes with each of the one or more authorized/licenced shared access reservation zones; store predetermined action for each category classification and reservation zone; receive a command from a network element related to activation or deactivation of one or more authorized/licenced shared access reservation zones; execute one or more predetermined actions on the basis of the command, for example.

Figure 6:
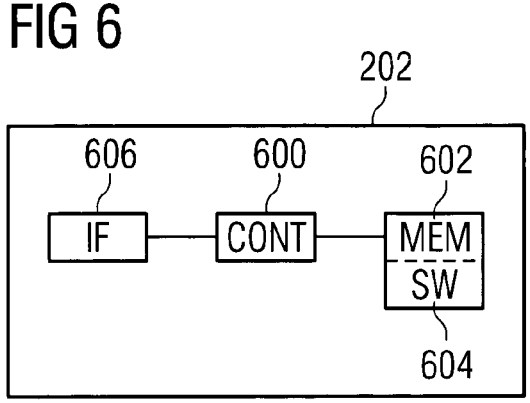
FIG. 6 illustrates another example of an apparatus applying some embodiments of the invention.

FIG. 6 illustrates an embodiment. The figure illustrates a simplified example of an apparatus in which embodiments of the invention may be applied. In some embodiments, the device may be an ASA/LSA controller ALC 202 or a part of an ALC.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 600 configured to control at least part of the operation of the apparatus.

The apparatus may comprise a memory 602 for storing data. Furthermore the memory may store software 604 executable by the control circuitry 600. The memory may be integrated in the control circuitry.

The apparatus may further comprise an interface 606 operationally connected to the control circuitry 600. The interface may connect the apparatus to other respective apparatuses such as eNodeB or base station, other network elements such as ALR or to the core network.

The software 604 may comprise a computer program comprising program code means adapted to cause the control circuitry 600 of the apparatus to control the interface 606.

The control circuitry 600 is configured to execute one or more applications. The applications may be stored in the memory 602. The applications may cause the apparatus to be in connection with one or more base stations serving one or more cells in a radio access system, the geographical area of the radio access system comprising one or more authorized/licenced shared access reservation zones, where the use of the resources of the zones may be activated or deactivated by a network element of the system; determine for each cell category classification information, the category classification information describing how the cell interferes with each of the one or more authorized/licenced shared access reservation zones; control the transmission of the determined category classification information to each base station; receive from another network element a request to activate or deactivate the use of the resources of the one or more authorized/licenced shared access reservation zones; transmit to the base stations a command comprising information related to the activation or deactivation of the one or more reservation zones.

Figure 7:
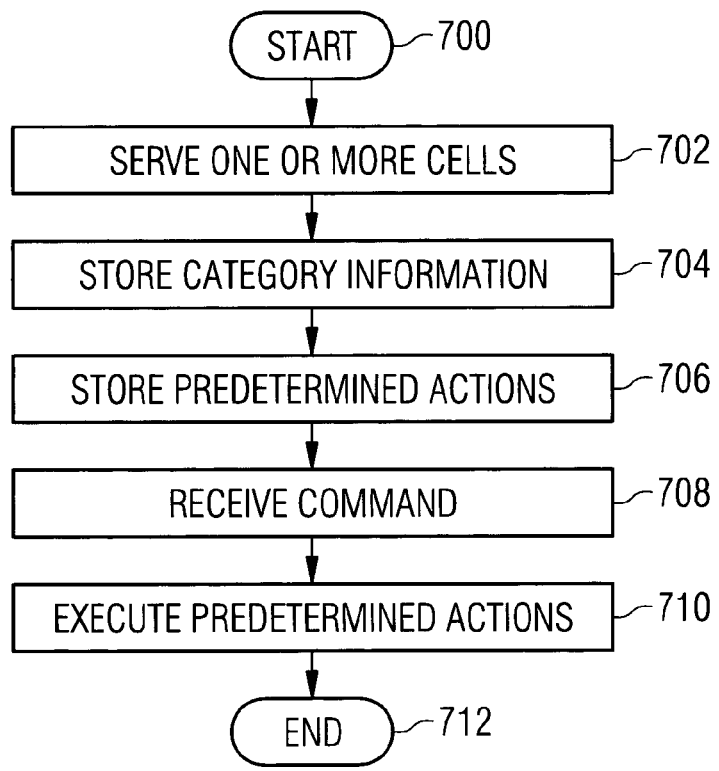
FIG. 7 is a flowchart illustrating an embodiment.

FIG. 7 is a flowchart illustrating an embodiment. The embodiment illustrates the actions of a base station. The embodiment starts at step 700.

In step 702, the base station is configured to serve one or more cells of a radio access system, the geographical area of the radio access system comprising one or more authorized/licenced shared access reservation zones, where the use of the resources of the zones may be activated or deactivated by a network element of the system.

In step 704, the base station is configured to, for each served cell, store category classification information, the category classification describing how the cell interferes with each of the one or more authorized/licenced shared access reservation zones.

In step 706, the base station is configured to store one or more predetermined actions for each category classification and reservation zone.

In step 708, the base station is configured to receive a command from a network element related to the activation or deactivation of one or more authorized/licenced shared access reservation zones.

In step 710, the base station is configured to execute one or more predetermined actions on the basis of the command.

The embodiment ends at step 712.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus to provide on-demand deactivation of use by a cell of spectrum resources based upon the cell's interference level with respect to one or more authorized/licensed shared access reservation zones, the apparatus comprising:

at least one processor; and at least one memory including computer program code, the at least one memory and the computer program code configured to, with the at least one processor, cause the apparatus at least to:

serve one or more cells, including at least a first cell of a radio access system, a geographical area of the radio access system comprising one or more authorized/licensed shared access reservation zones including at least a first shared access reservation zone, where the use by the one or more cells, of resources of the authorized/licensed shared access reservation zones is activated or deactivated with a configuration by a network element of the radio access system;

store, for each served cell, category classification information, the category classification information describing an interference level of each of the one or more cells with respect to each of the one or more authorized/licensed shared access reservation zones, where the category classification information of the first cell indicates that the first cell interferes with the first shared access reservation zone;

store one or more predetermined actions for each of category classifications and shared access reservation zones, wherein the one or more predetermined actions include a deactivation of use by the first cell of resources of the first shared access reservation zone;

receive a command from a network element indicating an activation of at least the first shared access reservation zone; and execute one or more of the predetermined actions in response to the command, including deactivating use by the first cell of resources of the first shared access reservation zone based on an interference by the first cell with the first shared access reservation zone.

2. The apparatus of claim 1, wherein the category classification information comprises for each cell a cell type classification for each reservation zone of the radio access system.

3. The apparatus of claim 2, wherein the predetermined actions are prioritized depending on the cell type the action is related to.

4. The apparatus of claim 3, wherein actions related to cell types describing high interference have higher priority than actions related to cell types describing low or minimal interference.

5. The apparatus of claim 1, wherein the predetermined actions comprise one or more of the following: modify cell configuration parameters to activate or deactivate the use of resources of a reservation zone, reduce the cell size, select an alternate cell configuration parameter set or resource control procedure set.

6. The apparatus of claim 1, further configured to receive from a network element the category classification information and the predetermined actions for each category classification and reservation zone.

7. An apparatus to provide on-demand deactivation of use by a cell of spectrum resources based upon the cell's interference level with respect to one or more authorized/licensed shared access reservation zones, the apparatus comprising:
   at least one processor; and
   at least one memory including computer program code, the at least one memory and the computer program code configured to, with the at least one processor, cause the apparatus at least to:
   communicate with one or more base stations serving one or more cells including at least a first cell in a radio access system, a geographical area of the radio access system comprising one or more authorized/licensed shared access reservation zones including at least a first shared access reservation zone, where a use, by each of the one or more cells, of resources of the one or more authorized/licensed shared access reservation zones is activated or deactivated with a configuration by a network element of the radio access system;
   determine, for each cell, category classification information, the category classification information describing an interference level of each of the one or more cells with respect to each of the one or more authorized/licensed shared access reservation zones, wherein the category classification information of the first cell indicates that the first cell interferes with the first shared access reservation zone;
   control a transmission of the determined category classification information to one or more of the base stations;
   receive from another network element a request to activate a use of the resources of at least the first shared access reservation zone; and
   transmit to the one or more base stations a command indicating an activation of at least the first shared access reservation zone, thereby causing the first cell to deactivate use by the first cell of resources of the first shared access reservation zone based on interference by the first cell with the first shared access reservation zone.

8. The apparatus of claim 7, wherein the category classification information comprises, for each cell, a cell type classification for each reservation zone of the radio access system.

9. The apparatus of claim 7, further configured to transmit to one or more of the base stations a predetermined action for each category classification related to each reservation zone.

10. A method of providing an on-demand deactivation of use by a cell of spectrum resources based upon the cell's interference level with respect to one or more authorized/licensed shared access reservation zones, comprising:
   serving one or more cells, including at least a first cell of a radio access system, a geographical area of the radio access system comprising one or more authorized/licensed shared access reservation zones including at least a first shared access reservation zone, where a use, by the one or more cells, of resources of the authorized/licensed shared access reservation zones is activated or deactivated with a configuration by a network element of the radio access system;
   storing, for each served cell, category classification information of each served cell, the category classification information describing an interference level of each of the one or more cells with respect to each of the one or more authorized/licensed shared access reservation zones, where the category classification information of the first cell indicates that the first cell interferes with the first shared access reservation zone;
   storing one or more predetermined actions for one or more category classifications and the one or more authorized/licensed shared access reservation zones, wherein the one or more predetermined actions include a deactivation of use by the first cell of resources of the first shared access reservation zone;
   receiving a command from a network element indicating an activation of at least the first shared access reservation zone; and
   executing one or more of the predetermined actions in response to the command, including deactivating use by the first cell of resources of the first shared access reservation zone based on interference by the first cell with the first shared access reservation zone.

11. The method of claim 10, wherein the category classification information comprises, for each cell, a cell type classification for each reservation zone of the radio access system.

12. The method of claim 11, wherein the predetermined actions are prioritized depending on the cell type the action is related to.

13. The method of claim 12, wherein actions related to cell types describing high interference have higher priority than actions related to cell types describing low or minimal interference.

14. The method of claim 10, wherein the predetermined actions comprise one or more of the following: modify cell configuration parameters to activate or deactivate the use of resources of a reservation zone, reduce the cell size, select an alternate cell configuration parameter set or resource control procedure set.

15. The method of claim 10, further comprising receiving, from a network element, category classification information and predetermined actions for each category classification and shared access reservation zone.

16. A method of providing on-demand deactivation of use by a cell of spectrum resources based upon the cells interference level with respect to one or more authorized/licensed shared access reservation zones, the method comprising:

communicating with one or more base stations serving one or more cells including at least a first cell in a radio access system, a geographical area of the radio access system comprising one or more authorized/licensed shared access reservation zones including at least a first shared access reservation zone, where a use, by each of the one or more cells, of resources of the authorized/licensed shared access reservation zones is activated or deactivated with a configuration by a network element of the radio access system;

determining, for each cell, category classification information, the category classification information describing an interference level of each of the one or more cells with respect to each of the one or more authorized/licensed shared access reservation zones, wherein the category classification information of the first cell indicates that the first cell interferes with the first shared access reservation zone;

controlling a transmission of the determined category classification information to the one or more of stations;

receiving, from another network element, a request to activate a use of resources of at least the first shared access reservation zone; and transmitting to the one or more base stations a command indicating an activation of at least the first shared access reservation zone, thereby causing the first cell to deactivate use by the first cell of resources of the first shared access reservation zone based on interference by the first cell with the first shared access reservation zone.

17. The method of claim 16, wherein the category classification information comprises for each cell a cell type classification for each shared access reservation zone of the radio access system.

18. The method of claim 16, further comprising transmitting, to one or more of the base stations, a predetermined action for each category classification related to each shared access reservation zone.

19. A computer program product embodied on a non-transitory computer-readable medium readable by a computer and comprising program instructions which, when executed by a processor, cause the computer to perform the method of claim 10.

* * * * *

UNITED STATES PATENT AND TRADEMARK OFFICE
CERTIFICATE OF CORRECTION

PATENT NO. : 9,906,962 B2
APPLICATION NO. : 14/895338
DATED : February 27, 2018
INVENTOR(S) : Markwart et al.

Page 1 of 1

It is certified that error appears in the above-identified patent and that said Letters Patent is hereby corrected as shown below:

On the Title Page

Column 2, item (57), under "ABSTRACT", Line 10, delete "licenced" and insert -- licensed --, therefor.

Column 2, item (57), under "ABSTRACT", Line 14, delete "authorized/licenced" and insert -- authorized/licensed --, therefor.

In the Claims

In Column 12, Line 62, Claim 1, delete "use" and insert -- use, --, therefor.

In Column 13, Line 6, Claim 1, delete "zone:" and insert -- zone; --, therefor.

In Column 13, Line 22, Claim 2, delete "cell a cell" and insert -- cell, a cell --, therefor.

In Column 14, Line 28, Claim 10, delete "first cell" and insert -- first cell, --, therefor.

In Column 15, Line 16, Claim 16, delete "cells" and insert -- cell's --, therefor.

In Column 16, Line 6, Claim 16, delete "of" and insert -- of base --, therefor.

In Column 16, Line 19, Claim 17, delete "cell a cell" and insert -- cell, a cell --, therefor.

Signed and Sealed this
Second Day of June, 2020

Andrei Iancu
*Director of the United States Patent and Trademark Office*